United States Patent [19]

Takenoya et al.

[11] 4,426,946
[45] Jan. 24, 1984

[54] STITCH CONTROL METHOD OF ELECTRONIC SEWING MACHINE

[75] Inventors: Hideaki Takenoya, Hachioji; Mikio Inamori, Hino; Hachiro Makabe, Kanagawa, all of Japan

[73] Assignee: Janome Sewing Machine Co. Ltd., Tokyo, Japan

[21] Appl. No.: 356,158

[22] Filed: Mar. 8, 1982

[30] Foreign Application Priority Data

Mar. 11, 1981 [JP] Japan .................. 56-33847

[51] Int. Cl.³ .............................................. D05B 3/02
[52] U.S. Cl. ................................ 112/266.1; 112/158 E
[58] Field of Search .......... 112/158 E, 121.11, 121.12, 112/220, 221, 262.1, 266.1

[56] References Cited

U.S. PATENT DOCUMENTS

| | | | |
|---|---|---|---|
| 4,308,814 | 1/1982 | Takenoya | 112/158 E |
| 4,318,357 | 3/1982 | Minalga et al. | 112/158 E |
| 4,340,002 | 7/1982 | Hanyu et al. | 112/158 E |

Primary Examiner—Peter P. Nerbun
Attorney, Agent, or Firm—Michael J. Striker

[57] ABSTRACT

In a stitch control process of the sewing machine which employs a microcomputer with an electronic memory storing stitch control signals and a needle position control motor and a fabric feed control motor, the microcomputer controls the needle position and the fabric feed control motors at certain rotation phases of the sewing machine. The microcomputer temporarily holds, during the operation of the sewing machine, the needle and feed control data and the feed control amount based on the feed control data which are read out in each phase and calculates the addition of the feed control amount and the needle control amount based on the needle control data which is read out at the following phase. If the calculating result is more than a predetermined value, the microcomputer employs the needle and feed control data read out at the preceding phase instead of the needle and feed control data read out at the following phase to control the feed and needle control motors with a total value of the needle and feed control amounts which is less than the predetermined value.

1 Claim, 12 Drawing Figures (1) Calculation of feed control amount
(2) Calculated feed control amount
(3) Feed control ← 15
(4) Feed control phase
(5) Sewing machine is OFF
(6) Needle control phase
(7) Output of feed control data
(8) Preceding feed control data ← feed control

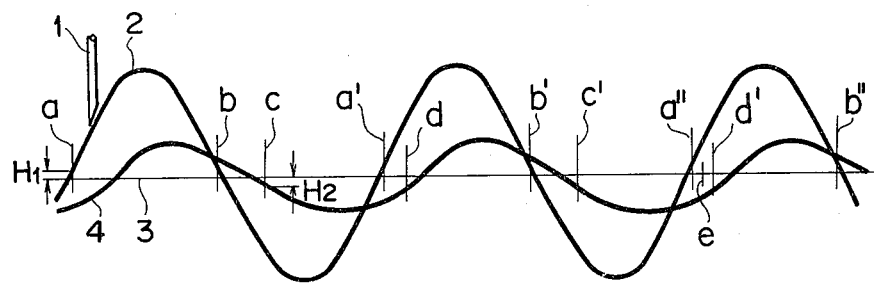
FIG_1
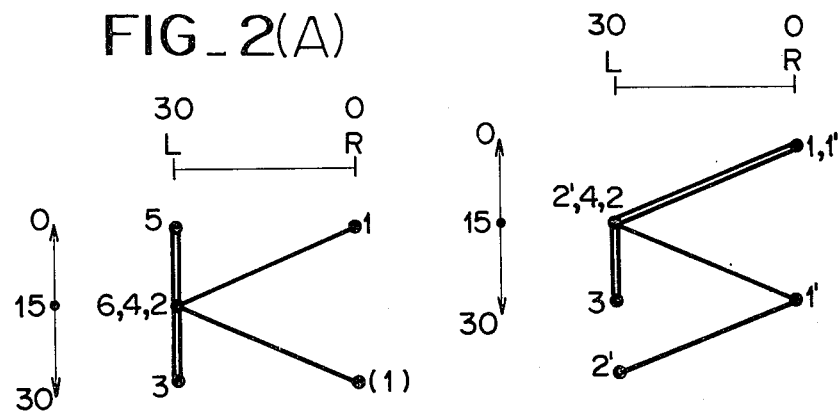
FIG_2(A)
FIG_3
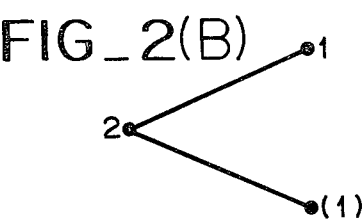
FIG_2(B)
FIG_4
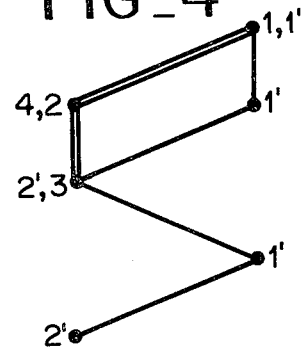

FIG_5(A)
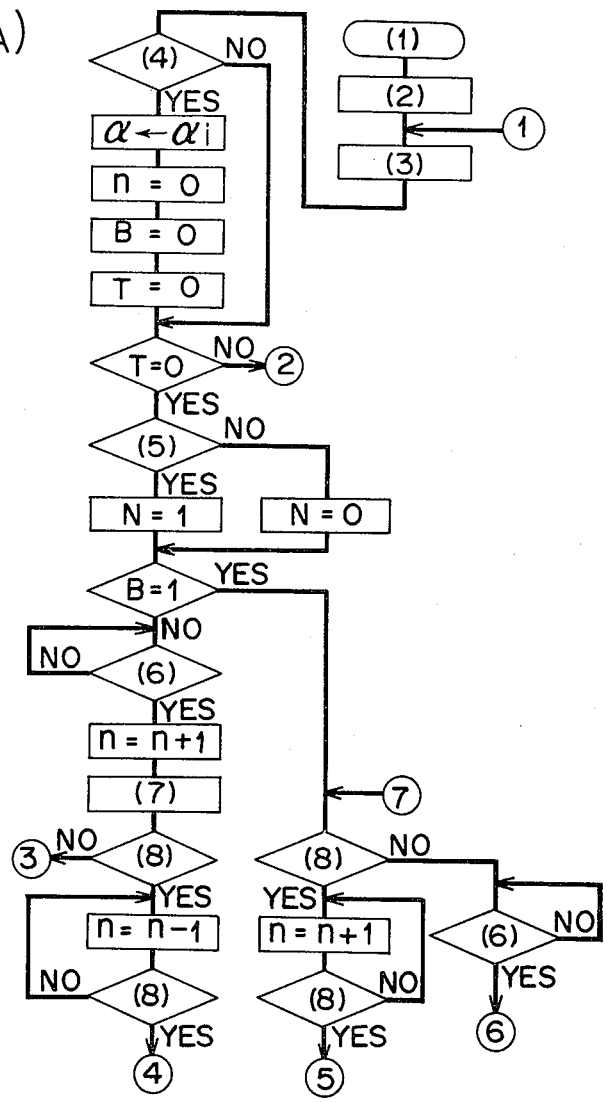
(1) Start  (2) Initial setting
(3) Reading-out of key
(4) Pattern selection
(5) Back stitching
(6) Needle control phase
(7) Present data ← ROM
(8) End code

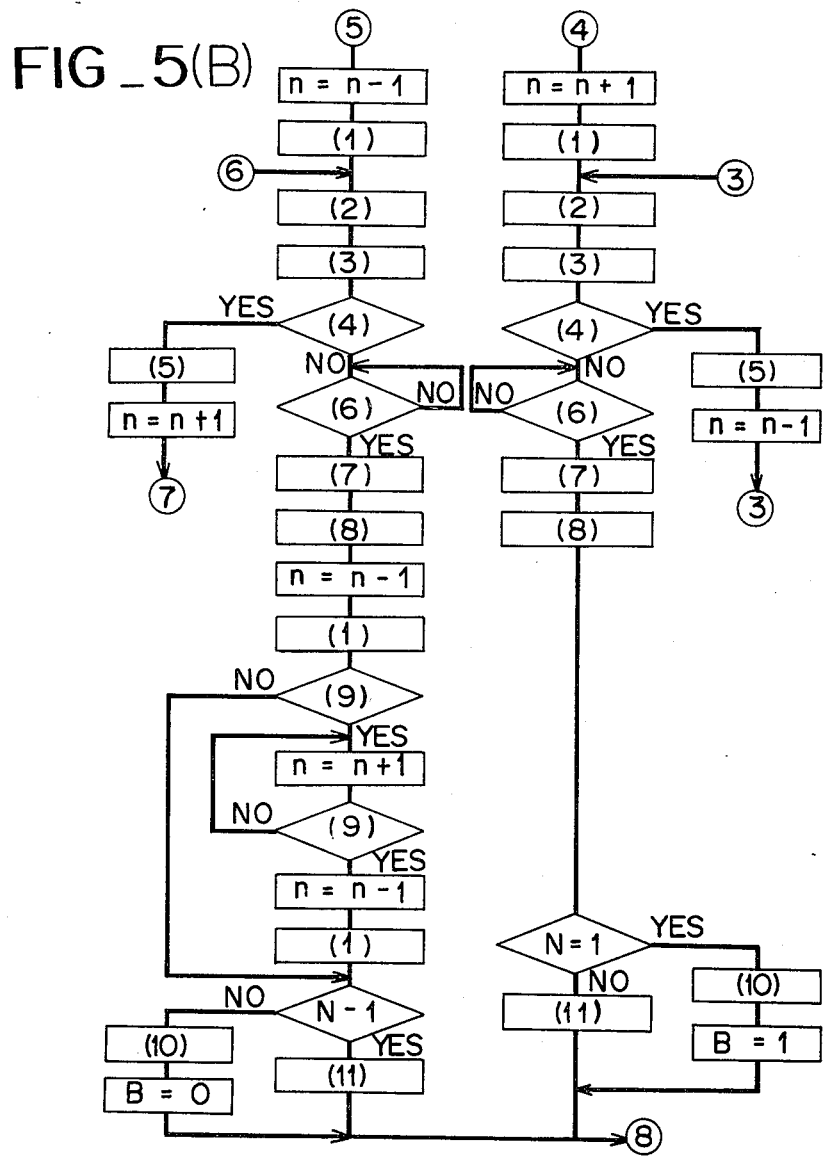
FIG_5(B)
(1) Present data ← ROM  (2) Needle position ← present control data  (3) Calculation of needle control amount  (4) Total ≥ 46
(5) Present data ← preceding data  (6) Needle control phase  (7) Output of needle control data
(8) Preceding needle control data ← needle position
(9) End code  (10) Feed control ← 15
(11) Feed control ← present feed control data

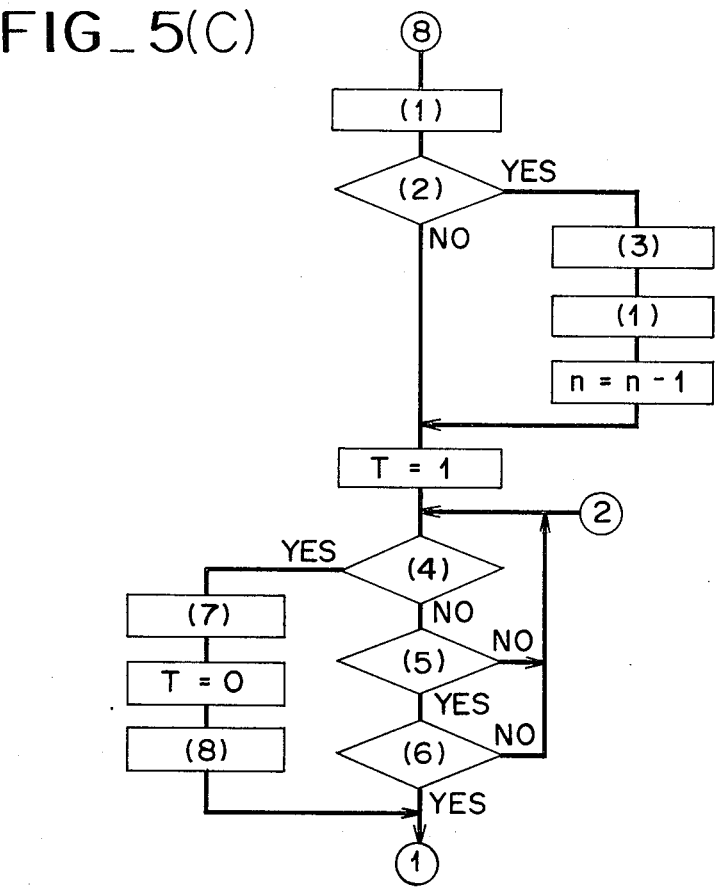
FIG_5(C)
(1) Calculation of feed control amount
(2) Calculated feed control amount
(3) Feed control ← 15
(4) Feed control phase
(5) Sewing machine is OFF
(6) Needle control phase
(7) Output of feed control data
(8) Preceding feed control data ← feed control

FIG_6

| (A) NO. | (B) Feed | | (C) Needle | | (D) |
|---|---|---|---|---|---|
| | (E) | (F) | (G) | (F) | |
| 1 | 30 | (0) | | | (30) |
| | | | 0 | (-30) | |
| 2 | 30 | 0 | | | 30 |
| | | | 30 | 30 | |
| 3 | 30 | 0 | | | 30 |
| | | | 30 | 0 | |
| 4 | 0 | -30 | | | 30 |
| | | | 30 | 0 | |
| 5 | 0 | 0 | | | 30 |
| | | | 30 | 0 | |
| 6 | 30 | 30 | | | 30 |
| | | | 30 | 0 | |
| (1) | (30) | 0 | | | 30 |
| | | | (0) | -30 | |

FIG_7

| (A) NO | (B) Feed | | (C) Needle | | (D) |
|---|---|---|---|---|---|
| | (E) | (F) | (G) | (F) | |
| 1 | 30 | (0) | | | (30) |
| | | | 0 | (-30) | |
| 2 | 30 | 0 | | | 30 |
| | | | 30 | 30 | |
| (1) | (30) | 0 | | | 30 |
| | | | (0) | -30 | |

A. Stitches
B. Feed
C. Needle
D. Total of control amount (Absolute value)
E. Control data
F. Control amount
G. Control data

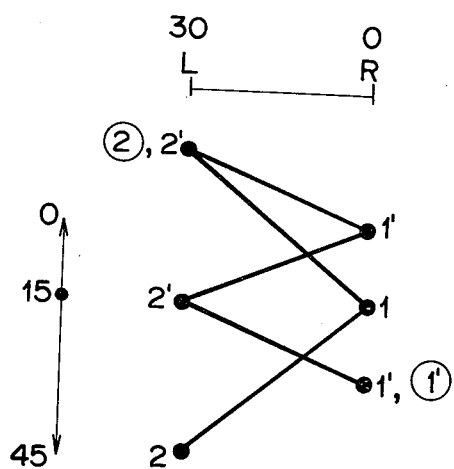
FIG_8
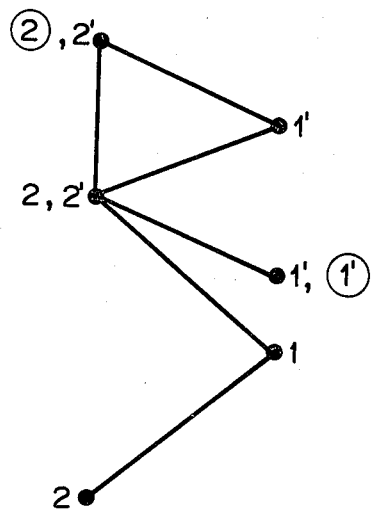
FIG_9

STITCH CONTROL METHOD OF ELECTRONIC SEWING MACHINE

BACKGROUND OF THE INVENTION

The invention relates to a stitch control method of operation an electronic sewing machine having an electronic memory storing stitch control data which are sequentially read out to control the stitch forming device of the sewing machine to produce various stitches of patterns.

Generally in electronic sewing machines, the fabric feed control motor controls the feed regulator at a rotation phase of the sewing machine when the needle penetrating a sewn fabric is coming up out of the needle plate, and the needle position control motor controls the needle at another rotation phase of the sewing machine when the needle is high up above the needle plate.

The invention has been provided to considerably reduce the totoal output of the needle position and fabric feed control motors which sequentially control the needle position and the fabric feeding movement, to thereby disperse the output density of the two control motors, to thereby moderate the control time period allotted to each of the control motors, and thereby to reduce the size as well as the capacity of the control motors.

According to the prior art, the control of the needle position is made, as shown in FIG. 1, in the rotation phase (a-b) of the sewing machine which phase is higher than the level $H_1$ above the needle plate 3 and is depicted by the moving locus 2 of the needle point 1 in relation to the rotation angle of the drive shaft of the sewing machine which is to be considered in the lateral direction. On the other hand, the control of the fabric feeding movement is made in the rotation phase (c-d) of the sewing machine, which phase is lower than the level $H_2$ below the needle plate 3 and is depicted by the moving locus 4 of the feed dog (not shown). Due to the function and structure of the sewing machine, there is, as shown, a control prohibition phase (b-c) between the phase (b) at which the control of the needle is to have been finished and the phase (c) at which the control of the feed dog is starting. On the other hand, there may be a phase (a'-d) in which the two control motors are required to be controlled at the same time in dependence upon the sizes of stitches. In such a case, it is required to provide so much capacity of power source and control motors, and also the control becomes so complex. Actually it has been designed to avoid the simultaneous actuation of the two control motors in such a phase (a'-d).

In this connection, it becomes necessary to explain the formation of stitch patterns as shown in FIGS. 2A and 2B in reference to FIGS. 6 and 7 showing the stitch control data of the respective patterns. The needle control data 0 corresponds to the needle position R at the right side end of the maximum needle swinging amplitude, and the data 30 corresponds to the needle position L at the left side end of the maximum needle swinging amplitude. The feed control data 0 corresponds to the muximum feeding amount (about 2.5 mm) in the back direction. The feed control data 15 corresponds to no feeding amount, and the data 30 corresponds to the maximum feeding amount (about 2.5 mm) in the forward direction. Further, it may be a feed control data 45 (though not shown) which corresponds to the maximum feeding amount (about 5 mm) in the forward direction by manual adjustment. The control amounts in FIGS. 6 and 7 are the difference values between the data of the preceding stitches and the data of the following stithces.

The stitch control data in FIG. 6 are employed to sequentially produce the stitches 1–6 forming a unit of pattern in FIG. 2A with the following stitch (1) for another same unit of pattern. Similarly the stitch control data in FIG. 7 are employed to produce the stitches 1–2 forming a unit of pattern in FIG. 2B with the following stitch (1) for another unit of pattern. In FIGS. 6 and 7, the maximum feed and needle control amount is 30 implying that the feed and needle control motors are required to operate to the maximum extent for each stitch of the pattern. The maximum sum total of the feed control amount and the following needle control amount is 30 (45 in the manual adjustment) in FIGS. 6 and 7, which is considerably smaller than 60 (75 in manual adjustment). It is therefore apparent that all region of phase (c-d) may be used to control the feed control motor with control amount 30 and that the region of phase (d-b') is enough to finish the control of the needle control motor because the control amount is far below 30. If the feed control amount is below 30 and the needle control amount is 30, the feed control motor may be controlled in the phase (c-a') and the needle control motor may be controlled in the phase (a'-b'). It is therefore possible to determine the capacity of the control motors in accordance with the maximum output to be produced by the motors within a period of time defined by the phases (c-d) and (a'-b).

However it often happens during the actual stitching operation that the total control amount of the feed and needle control motors comes up to 60 when a new pattern is selected during a stitching operation of one pattern. FIG. 3 shows such an embodiment of the pattern. In reference to FIG. 1, if a new pattern is selected at a phase before a phase (a) or (a', a''), it is to be assumed that a new data is read out at the phase (a) or (a', a'') for controlling the needle and feed dog. More precicely, if the pattern in FIG. 2B is selected, during the formation of the pattern in FIG. 2A, in the phase (a-a') corresponding to the phase before the phase (a) at which the stitch 4 is formed up, the feed control data in the phase (c-d) is 0 for forming the stitch 5 in FIG. 2A and the feeding amount is 0, and the needle control data is 30 for the stitch 4. Then at the phase (a') the needle control data 0 is read out for forming the stitch 1 in FIG. 7 corresponding to the stitch 1' in FIG. 3, and the feed control data 30 is going to be read out for forming the stitch 2. In the phase (a'-b'), the control amount of the needle is 0−30=30. Thus the total amount (the absolute value) is 30. However, in the following phase (c'-d') the feed control amount for the stitch 2 is 30−0=30 because the feed control data is 30, and at the phase (a'') the needle control data 30 is read out for the switch 2 in FIG. 7 and the feed control data 30 is read out for the stitch (1). Therefore, in the phase (a''-b'') the needle control amount is 30−0=30. Thus, the total control amount (the absolute value) is 60.

The feed and needle control motors have to be controlled each with the maximum control amount 30 in the phase (c'-b''), and have to be switched over in the phase (a''-d'). In dependence upon the switchover point to be taken within the phase (a''-d'), one of the control motors is so much loaded while the other is so less loaded. Provided that the switchover of the control motors is made at the intermediate point (e) of the phase (a''-d') for the convenience sake, the feed and needle control motors, which are designed to be normally controlled to the maximum amount in the phases (c'-d') and (a''-b''), respectively, for the repeating formation of the same pattern, would be short of capacity and may be led to erroneous operation due to the shortened control time of the motors defined by the phases (e-d') and (a''-e) respectively in case a new pattern is selected during the formation of the pattern. In order to avoid such undesirable effects, it becomes necessary to increase the size as well as the capacity of the control motors.

SUMMARY OF THE INVENTION

It is therefore a primary object of the invention to avoid an excessively heavy load which may be applied to the feed and needle control motors at the time of selection of a new pattern during a successive and repeated formation of a pattern. For attaining this object, a microcomputer controlling the feed and needle control motors temporarily holds, during rotation of the sewing machine, the needle and feed control data and the feed control amount based on the feed control data which are read out in each phase as shown in FIG. 1, for example at the phase (a) or (a'), and calculates the addition of the feed control amount and the needle control amount based on the needle control data which is read out at the following phase (a') or (a''). If the calculating result is more than a predetermined value, the microcomputer employs the needle and feed control data read out at the phase (a) or (a') instead of the needle and feed control data read out at the phase (a') or (a'') to control the feed and needle control motors with a total value of the needle and feed control amounts which is less than the predetermined value.

BRIEF DESCRIPTION OF THE DRAWINGS

FIG. 1 is a motion diagram showing the moving loci of the needle and the feed dog;

FIGS. 2A, 2B, 3 and 4 show many examples of different stitch patterns;

FIGS. 5A, 5B and 5C are control flows of the invention;

FIGS. 6 and 7 are tables of stich control data for producing patterns in FIGS. 2A and 2B; and FIGS. 8 and 9 are examples of other different stitch patterns.

DETAIL DESCRIPTION OF THE INVENTION

FIG. 4 shows a stitch pattern which is produced when the stitch pattern in FIG. 2B is selected just before the stitch 4 of the pattern in FIG. 2A during formation thereof. As is apparent from the stitch control in FIG. 3, the feed control amount is 30 for producing the second stitch 2' which requires the needle control amount 30. Since the total control value of the feed and needle control motors is excessive, a microcomputer installed in the sewing machine employs the needle and feed control data which were precededly read out from one electronic memory (ROM) instead of the needle and feed control data which are subsequently read out from the ROM, so as to control the needle and feed control motors with a total control amount or value less than a predetermined amount or value.

The control operation will now be described in reference to the flows in FIGS. 5A–5C. Upon application of a control power source, the program control of the microcomputer starts. If a pattern is not selected, the straight stitching is designated as the initial setting by a register α, and then it is read out if the pattern selecting keys have been operated or not. If there is no selection of a pattern selecting key immediately after application of control power source, this is identified to have selected the straight stitching and the control is continued. In accordance with the selection of a pattern, the corresponding pattern designating signal is stored in the register α. In this case, it is to be assumed that the pattern in FIG. 2A is selected when the sewing machine is at standstill, and the corresponding pattern designating signal $α_1$ is stored in the register α. In FIG. 5A $α_1$, $α_2$, ... are represented by $α_i$.

Then the address n of the addresses for controlling the stitches of the selected pattern is made 0 to repeat the formation of the same pattern. The flag B showing the condition before the selection of the pattern is reset 0 which is set 1 when the sewing machine is switched over from the forward stitching to the backward stitching. Then the flag T is reset 0 for making effective the function to advance the addresses n. Since there is no back stitching, the corresponding identifying signal N is made 0. Since B is 0, the addresses n are advanced from 0 to 1 in the needle control phase (a-b) or (a'-b', a''-b''), but at the phase (a), (a') or (a'') when the sewing machine is driven. The stitch control signal is read out from the memory ROM at the address $α_1+1$ of the stitch 1 of the pattern $α_1$. The stitch control signal includes a needle-control data for the stitch No. 1 and a feed control data for the stitch No. 2 in FIG. 6. As the stitch control signal is not the last code of the pattern, the needle control data is employed in the next process through the path ③. The needle control amount represented by the stepping distance of the needle control motor in FIGS. 6 and 7 is calculated by the formula:

needle control amount = present needle position − preceded needle position.

In the formula, the present needle position corresponds to the needle control data for the stitch No. 1 in FIG. 6 and the preceded needle position corresponds to the needle control data read out to form the stitch preceding the stitch No. 1.

The preceded needle control data is based on the initial set value of the needle control motor in the first calculation after the control power source is applied. Then the discrimination is made of the calculated needle control amount + the calculated feed control amount ≧ 46.

The feed control amount is 0 in the first calculation after the control power source is applied. The value 46 includes the feed control amount which may be manually adjusted, and is a critical value which will never be attained by a repeating formation of a normally set pattern, but may be attained by a total control amount of the feed and subsequent needle when a designation is given to change a mode in other way than the repeating formation of a pattern.

In this case, as the maximum total control amount is 30 (45 by manual feed adjustment) in FIG. 6 for forming up the stitch pattern in FIG. 2A, the needle control motor is driven with the calculated control amount in the phase (a-b) or (a'-b', a''-b''). After the elapse of a predetermined period of time in which the needle control motor has been driven, the needle control data is elected as the preceding needle control data. Since this includes no back stitches, N is 0 and then the feed control data read out at the address $\alpha_1 1$ is employed. Through the path ⑧, the feed control amount is calculated in the formula:

feed control amount = present feed movement − preceded feed movement.

In the formula, the preceded feed movement is based on the initial set of the feed control motor. Then a discrimination is made of the calculated feed control amount ≧ 31.

This is to prevent the feed control amount from being more than 31, even if by manual adjustment so as to limit under a predetermined value the total control amount including the following needle control amount, to thereby drive the feed and needle control motors with a less total control amount.

In this case, the feed control amount is not more than 31, the flat T is made 1 so as not to further advance the addresses n of the memory ROM. During the rotation of the sewing machine, the feed control motor is driven with the calculated amount in the phase (c-d) or (c'-d') to determine the fabric feeding amount for the stitch No. 2 in the phase following the phase (d). After the elapse of a predetermined period of time, T is made 0 and the feed control data is elected as the preceding control data, and then the program returns to the path ①. In the meantime, if there is no selection of a new pattern, a stitch control signal is read out at the address $\alpha_1 + 2$ at the phase (a') during the rotation of the sewing machine. Then by way of the path ③.

the calculated needle control amount + the
calculated feed control amount is not more than 46 as shown in FIG. 6, and the needle control motor is driven in the phase (a'-b'), which is described as (a') hereinafter with the calculated control amount for forming up the stitch No. 2, and then the feed control motor is driven in the phase (c') with the calculated control amount for the stitch No. 3. Then the program returns to the path ①. In the same way, the stitches No. 3 and No. 4 are formed.

It is now to be assumed that the stitch No. 4 is formed up at the phase (a'), and the different pattern as shown in FIG. 2B was selected in the preceding phase (a-a'). The selected pattern may be described as $\alpha_2$. In FIGS. 5A-5C, it is discriminated that the new pattern has been selected. Then the address of the stitch No. is reset to $\alpha_2 + 0$, and the flags B and T are made 0. The feed control data, which is to be read out in the phase (c-d) to control the feed control motor, is read out at the phase (a) before the program returns to the path ① in correspondence to the address $\alpha_1 + 4$ in the process designated by the present address $(\alpha + n)$, and the value of the feed control amount is 0 for the stitch No. 5 as shown in FIG. 6. The simultaneously read out needle control data for the stitch No. 4, that is, the needle position following the path ③ is 30 and the needle control is finished in the phase (a-b).

After the program has returned to the path ①, the address comes to $\alpha_2 + 1$ in the phase (a') and the needle control data 0 is read out for the stitch No. 1 in FIG. 7 (corresponding to 1' in FIG. 3) and simultaneously the feed control data 30 is read out for the stitch No. 2. As a result, the needle control amount = present needle
position − preceding needle position becomes 0−30=−30, and the needle control motor is controlled in the phase (a'). This produces the stitch No. 1' after the stitch No. 4 in FIG. 4. The total control amount of the feed and needle control motors is 30 which is far below a predetermined critical value. By way of the path ⑧, the feed control amount is calculated, that is, the feed control amount = present feed
movement − preceding feed movement.

In this formula, the present feed movement is the feed control data 30 which was read out in the phase (a') for the stitch No. 2 in FIG. 7, and the preceding feed movement is the feed control data 0 for the stitch No. 5 in FIG. 6. Therefore, the feed control amount=30−0=30. The feed control motor is driven with the calculated feed amount at the phase (c'). Then the program returns to the path ①, and the address comes to $\alpha_2 + 2$ at the needle control phase (a''), and the needle control data 30 is read out for the stitch No. 2 in FIG. 7 and the feed control data 30 is read out for the stitch No. 1. By way of the path ③, the calculation is made, the needle control amount = the present needle
position − the preceding needle position.

Since the present needle control data is 30 and the preceding needle control data is 0, the needle control amount=30−0=30. Therefore, the calculated needle control amount + the
calculated feed control amount = 60 > 46.

Then the preceding needle data 0 and feed control data 30, which were read out at the phase (a'), are used as the present data instead of the present needle control data 30 and feed control data 30, and the calculation n=n−1 is made. Then by way of the path ③, the needle control amount is calculated with the needle control data 0. As a result, the needle control amount becomes 0, and the calculated needle control amount + the
calculated feed control amount = 30 ≦ 46.

Thus the needle control motor is controlled with the needle control 0, and produces the next stitch No. 1' after the first stitch No. 1' in FIG. 4.

Then by way of the path ⑧, the calculation is made of the feed control amount = the present feed
movement − the preceding feed movement in which the present and preceding feed movements are both 30 which were read out at the phase (a'), and therefore the feed control amount is 0. In the subsequent feed control phase the feed control motor is controlled with the feed control amount 0. The calculation n=n+1 by way of the path ① designates the address $\alpha_2 + 2$ in the subsequent needle control phase to read out the needle control data 30 for the stitch No. 2 in FIG. 7 and the feed control data 30 for the stitch No. 1. The precededly read out feed control data and the present needle control data produce the stitch No. 2' in FIG. 4. Then by way of the path ①, the calculation n+1 is made and the present address (α+n) designates a process to read out the end code which is not shown in FIGS. 6 and 7. Namely, the memory (ROM) stores an end code (for example, 31) before the code for the first stitch and next to the code for the last stitch to repeatedly form a same pattern. Therefore, the calculation n=n−1 is made The subsequent control may be explained in reference to FIG. 6. Namely, as the stitches are progressively produced until the end code is reached before the stitch No. 1, the calculation n=n+1 is made by way of the path ④ to read out the data for the stitch No. 1, to thereby repeat the same pattern.

In FIGS. 3 and 4, the patterns are partly different from a single pattern of stitches, and also different in dependence upon the pattern changeover time. If a new pattern, for example, the pattern in FIG. 2B, is selected after the sewing machine is stopped on the way of stitching a pattern, for example, the pattern in FIG. 2A, the microcomputer identifies the stop of the sewing machine and shifts the process of the calculated needle control amount+the calculated feed control amount≧46 to the routine of the stitch, and to thereby the connection of patterns as shown in FIG. 3. In this case, the driving time of the feed control motor is out of the question. The discrimination of the calculated feed control amount≧31 may be possible when the feed control has been made by manual adjustment before a new pattern is selected. In this case the feed control amount is calculated with the present control data 15 to drive the feed control motor with the calculated feed control amount. The process of the discrimination may be also shifted to the routine of the stitch.

Now explanation will be given to the back stitches which are to be produced at the start as well as at the end of a series of zigzag stitches. FIG. 8 shows the zigzag stitches including the stitches formed with a feed control of manual adjustment, and showing an excessive total of the feed and needle control amounts at the time of changeover from the back stitching to the forward stitching. Such a condition arises when the feed amount is manually adjusted. In reference to FIG. 8, the maximum backward feed amount is 2.5 mm provided by the feed control data 0 as mentioned hereinbefore. The feed movement is nullified by the feed control data 15. The maximum forward feed amount is 5 mm provided by the feed control data 45. The backward stitches are preferable to trace the same forward stitches when the feed control amount is automatically set, that is, when the forward feed amount is not more than 2.5 mm. It is, however, impossible for the back stitches to trace the forward stitches when the forward feed amount is more than 2.5 mm as shown in FIG. 8. In this case, the pattern structure itself of the forward and backward stitches is of no significance. However, in view of the fact that such a pattern is formed by the sewing machine, it is a matter of significance to be solved that such a pattern of stitches requires an excessive total of the feed and needle control amounts, often resulting in controlling the needle while it is still in the fabric.

In reference to FIGS. 5A–5C, it is to be assumed that back stitches have been designated in zigzag stitching. The pattern of stitches is $\alpha_3$. The address is reset to $\alpha_3+0$ and the flags B and T become 0. Since the present stitch is back stitching, N=1 and the address becomes $\alpha_3+1$, and then the needle control data 0 and the feed control data 45 are read out in the phase (a-b). In the zigzag stitches by manual adjustment, the feed control data is read out, for example, as 45 and the data is changed, for example, to 0 in the back stitches as will be described hereinafter.

By way of the path ③, with the read out needle control data and the pattern selection immediately after the application of the control power source, the needle control amount 0 is calculated and the needle control motor is driven in the phase (a-b). The resultant stitch is No. 1′ in FIG. 8. Since N=1, the feed control data is 15, and since the process is from the forward stitching to the backward stitching, the flag B becomes 1. This routine is a control way to produce the forward and backward stitches. By way of the path ⑧, the feed control amount 15 is calculated and the flag T becomes 1. As the sewing machine is rotated, the feed control motor is driven with the control amount in the phase (c-d). The control amount is 0 mm. Then T=0 and the path ① is taken. Since B=1, the path ⑥ is further taken, and the needle control data at the address $\alpha_3+1$ is used as the present data and the needle control amount 0 is calculated. Then the needle control motor is driven at the phase (a′) with the control amount 0 and produces the stitch No. ①′ in FIG. 8. In the phase (a′), n=n−1 and therefore the address is $\alpha_3+0$. Since this is the end code, the calculation n=n+1 is repeated. As the address $\alpha_3+3$ is reached, which is another end code, the calculation n=n−1 is made and the address comes to $\alpha_3+2$. Then the needle control data 30 and the feed control data 45 are read out in the phase (a′). Since N=1, the present feed control data at the address is inverted around the feed control amount 0. Namely, if the read out feed control data is below 30, the calculation 30−the present feed control data is made. If the forward feed control data is above 30, the data is changed to 0 in the backward feed, and the calculated feed control data becomes 0.

By way of the path ⑧, the feed control amount (−15) is calculated and T=1, and then the feed control motor is driven with the control amount (−15) in the phase (c′). Then the flag T=0, and by way of the paths ① and ⑥, in the phase (a″), the needle control amount 30 is calculated from the needle control data 30 read out at the address $\alpha_3+2$ in the phase (a′) and the preceding needle control data 0, and the needle control motor is driven with the calculated control. Thus the feed control amount (−15) and the needle control amount 30 produce the stitch No. 2′ in FIG. 8.

Now it is to be assumed that in the phase (a), the data for the stitch No. 2′ was read out at the address $\alpha_3+2$ in the process n=n−1 before N=1 by way of the path ⑥ The needle control data is 30 and the feed control data is 45. The feed control data is changed to 0 which becomes an output in the phase (c) by way of the path ⑧ and then the preceding feed control data is made 0 and the program returns to the path ①. If a designation is made in the phase (a-a′) to change the feed to the forward feeding, then N=0 and B=1, and accordingly the needle control data 30 controls the needle in the phase (a′) through the path ⑥. The needle control data 30 and the feed control data 0 in the phase (c) produce the stitch No. 2'. In the process of n=n−1 in the phase (a'), the needle control data 0 and the feed control data 45 are read out at the address $\alpha_3+1$. Since N=0, the feed control data is made 15 and B=0 and the feed control data 15 is read out at the phase (c') by way of the path ⑧. At this time the feed control amount is −15 which is 0 mm. Then the preceding feed control data is made 15 and the program returns to the path ①. Since B=0, the needle control data 30 and the feed control data 45 are read out at the address $\alpha_3+2$ in the phase (a''). The needle control data 0 is not used which was read out in the preceding phase (a') by the calculation n=n−1. Namely, in the present process the calculation n=n+1 is made to read out the needle control data again which was read out in the phase (a). By way of the path ③, the needle control amount is calculated and the result is 0. Then the needle control motor is driven with the needle control data 30 in the phase (a''). Thus the needle control data 30 and the feed control data 15 in the phase (c') produce the stitch No. ②.

If the phase (2'') is taken as the phase (a), the aforementioned feed control data 45 is read out in the phase (c). The feed control amount is:

Feed control amount = 45 − 15 = 30.

Then by way of the path ①, the address $\alpha_3+3$ is reached in the phase (a'). Since this is the end code, the address becomes $\alpha_3+1$ by way of the path ④. Then the needle control data 0 and the feed control data 45 are read out, and the calculation is made:

the needle control amount = 30 − 0 = 30.

As the needle control motor is driven in the phase (a') and the feed control motor is driven in the phase (c), the stitch No. 1 is produced. In this respect, since the feed control amount in the phase (c) is 30 in the above calculation, the calculated needle control amount + the
calculated feed control amount = 60.

This value is more than 45 which is the maximum total value of the needle and feed control amounts at issue of this application. Therefore, the needle control amount 30 to be carried out in the phase (a') will give the needle control motor an overload, and it becomes difficult to control the needle while it is located above the fabric to be sewn.

According to the invention, when the case is the calculated needle control amount + the
calculated feed control amount ≧ 46, the preceding data, that is, the data read out in the phase (a) is used as the present data in place of the data read out in the phase (a'). FIG. 9 shows a pattern of stitches produced in accordance with this invention eliminating the difficulties shown in FIG. 8. The difference is as follows: In FIG. 9, as the case comes to the calculated needle control amount + the
calculated feed control amount ≧ 46, the needle control data 30 and the feed control data 45, which were read out at the address $\alpha_3+2$ in the phase (a), are used in place of the needle control data 0 and the feed control data 45 which are read out at the address $\alpha_3+1$ in the phase (a'). Then the address becomes $\alpha_3 30$ by way of the path ③ an the calculation is obtained;

the calculated needle control amount = 30 − 30 = 0, and therefore,
the calculated needle control amount + the
calculated feed control amount = 0 + 30 = 30.

Thus the obtained total value is far below the maximum permissible total value of the needle and feed control amounts. Therefore, the needle and feed control motors can be driven with a sufficient surplus of time, and the needle control in the phase (b') and the feed control in the phase (c) produce the stitch No. 1.

What is claimed is:

1. In a stitch control method in operation of a sewing machine of the type having stitch forming instrumentalities, a microcomputer having an electronic memory storing stitch control signals including data for controlling a needle position and a fabric feed of the sewing machine to produce a series of stitches of a selected pattern, a needle position control motor and a fabric feed control motor which respectively control the needle position and the fabric feeding movement, said microcomputer controlling the needle position and the fabric feed control motors such that said microcomputer reads out the stitch control signals from the electronic memory at predetermined rotation phases of the sewing machine to programmingly control the stitches of a selected stitch pattern and a repeated formation of the pattern, said microcomputer seeking a feed control amount from the difference between the last feed control data and the preceding feed control data, and a needle control amount from the difference between the last needle control data read out subsequently to the last feed control data and the needle control data read out in precedence of the last needle control data, said microcomputer employing the preceding needle control data in place of the last needle control data upon identification of the total value of the feed control amount and the needle control amount to be over a predetermined value, to thereby control the stitches of the selected pattern.

* * * * *